United States Patent Office 3,514,570
Patented May 26, 1970

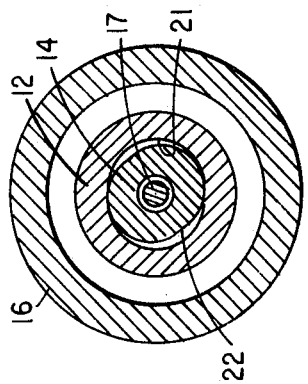
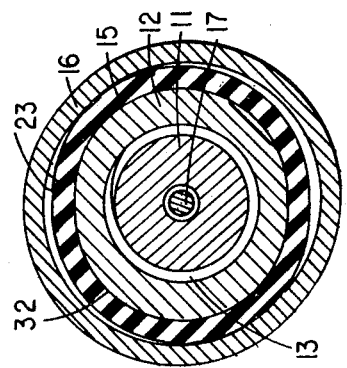
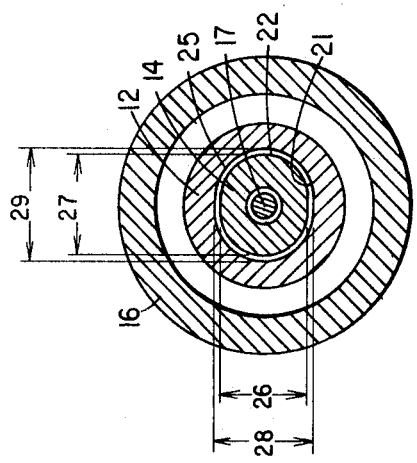
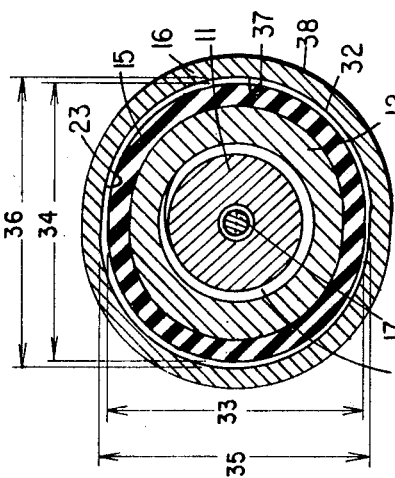
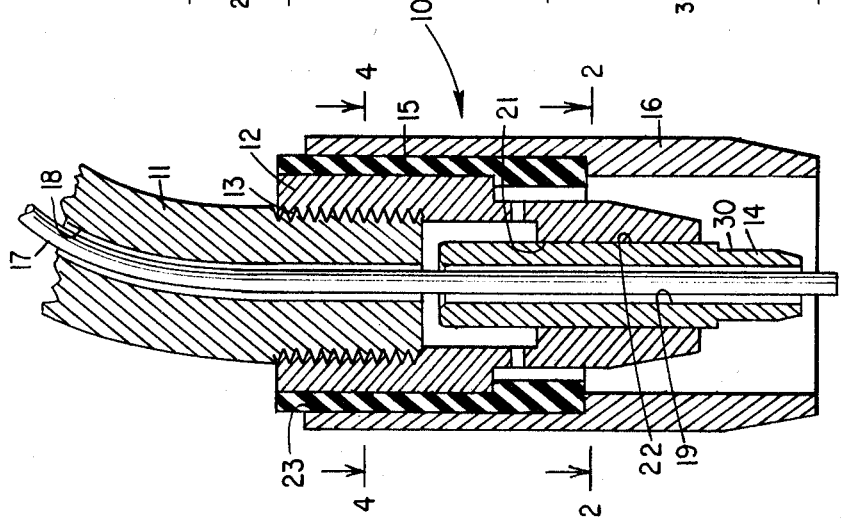

3,514,570
ARC WELDING GUN COMPONENTS
Arthur A. Bernard, Beecher, and Richard A. Bernard, Flossmoor, Ill., assignors to Bernard Welding Equipment Company, Beecher, Ill., a corporation of Illinois
Filed Dec. 4, 1968, Ser. No. 781,151
Int. Cl. B23k 9/00
U.S. Cl. 219—130         7 Claims

ABSTRACT OF THE DISCLOSURE

In an arc welding gun head assembly, a novel means for connecting the contact tip and gas nozzle to the head member. The head member has a periphery of oval cross-sectional shape and a bore of oval cross-sectional shape. The current contact tip has a periphery of oval cross-sectional shape such that the contact tip is adapted to be telescoped within the head member and locked in place by rotating the contact tip within the head member bore to lock the contact tip firmly in place. Insulating means are carried on the head member such that the periphery of the insulating means takes on the oval shape of the head member periphery. The gas nozzle has a bore which is also of oval cross-sectional shape such that the gas nozzle is adapted to be telescoped over the insulating means and locked in place by rotating the gas nozzle relative to the head member to wedge the gas nozzle firmly on the insulating means.

---

This invention relates to components of arc welding guns of the type used for applying continuous lengths of consumable electrode which are mechanically fed to and through the guns to the welding arc. More particularly, this invention relates to a new means for attaching a welding current contact tip and a gas nozzle to an arc welding gun.

All makes of arc welding guns have a head member at the arc end of the gun to which the welding current contact tip and, when shielding gas is used, the gas nozzle are connected or attached. Possibly no problem in the design of arc welding guns has been more difficult to solve than connecting the gas nozzles and the contact tips to the guns. Heretofore, the method used by most manufacturers for attaching both the gas nozzles and the contact tips to the head assemblies has been threaded connections. The threaded connections, however, pose difficulties.

A gas nozzle with a threaded connection does not stand up under the severe impacts to which the nozzles are subjected by the welding operators when they hammer the nozzles against the weldment to dislodge weld spatter accumulated within and around the arc end of the nozzles. First, the hammering loosens the threaded connections; then, once loose, the continual hammering chews up the threads. Most manufacturers have adopted the use of a modified Acme Thread, but even with this type of thread the problem still exists.

The use of a threaded connection for attaching the contact tip creates several difficulties. The welding currents used in arc welding are constantly being increased in magnitude to lower welding costs with the result that the contact tips now are heated to temperatures causing the contact tips to glow a dull red. At these high temperatures, the threaded connections become locked, and the threads strip when the contact tips are removed. Also, a contact tip which is threaded must be of a large diameter because it is the cross-sectional area at the root of the thread which governs the bend strength, and if the contact tip is handling a larger size of electrode with a cross-section that is too small at the root of the thread, the contact tip will bend as the curvature of the electrode is straightened out as the electrode is fed through the bore of the contact tip. In addition, when a threaded contact tip is reconnected to the head assembly, invariably, overlooked small globules of weld spatter are carried into the threaded connection and finally ruin the threads.

Because of the difficulties associated with the use of threaded connections for attaching the contact tip and the gas nozzle to an arc welding gun, there has existed a long felt need for a simple, effective, threadless connecting means. The applicants' Pat. No. 3,283,121 and their present copending application Ser. No. 650,051, filed June 29, 1967, both disclose inventive contributions toward providing a threadless connecting means. Nevertheless, the need for further significant development has continued to exist.

Therefore, a principal object of this invention is to provide a threadless method of connecting the gas nozzles and contact tips to the head assembly. Still another object is to provide a method of connecting these two parts to the head assembly of an arc welding gun which is very simple, yet very positive in holding power.

Another principal object of this invention is to provide an entirely new means for attaching both gas nozzles and contact tips to wedling guns which will withstand high temperatures without loosening or destruction of the connection and which will withstand several times the amount of hammering that conventional threaded connections can withstand.

Welding current contact tips and gas nozzles are made of copper or copper alloys and, due to a rapid rate of oxidation caused by the high temperatures to which they are heated, they must be discarded as scrap rather frequently. Hence, their cost to the user must be included into the overall cost of producing each foot of weld applied. Actually, in plants using several hundred welding guns, many times this number of tips and gas nozzles are scrapped each month. The cost of the copper by weight in each contact tip or gas nozzle is the principal factor in their cost to the user. Therefore, another important object of this invention is, through simplicity of this new means of attachment, to use less copper and reduce manufacturing costs yet increase physical values so that the cost of these pars to the user is substantially less than the cost has been heretofore.

It is a specific object of this invention to provide a simple and effective means for attaching the contact tip and the gas nozzle to the head member in the head assembly of an arc welding gun by employing compatible oval shapes for the element being attached and for the receiving element so that the two elements can be brought into telescoped relation one with the other and locked together by rotating the element being attached relative to receiving element.

These and other objects, features, and advantages of the present invention will be better understood by reference to the following detailed description taken in conjunction with the accompanying drawings.

In the drawings:

FIG. 1 is a cross-sectional view of the arc end of an arc welding gun of the type used for either semiautomatic arc welding or fully automatic arc welding.

FIG. 2 is an enlarged cross-sectioinal view taken at 2—2 of FIG. 1 with the contact tip unlocked from the head member.

FIG. 3 is an enlarged cross-sectional view taken at 2—2 of FIG. 1 with the contact tip locked to the head member.

FIG. 4 is an enlarged cross-sectional view taken at 4—4 of FIG. 1 with the gas nozzle unlocked from the head member.

FIG. 5 is an enlarged cross-sectional view taken at 4—4 of FIG. 1 with the gas nozzle locked to the head member.

Referring now more specifically to FIG. 1, a head assembly 10 is shown connected to the arc end of a main trunk member 11 of the arc welding gun. The head assembly includes a head member 12 affixed to the main trunk member 11 by a threaded connection 13, a welding current contact tip 14, an electrical insulating sleeve 15, and a gas nozzle 16. A consumable type electrode 17 is shown passing through the bore 18 of the main trunk member 11, through the head member 12 for a short distance, and through the bore 19 of the welding current contact tip 14.

In FIG. 1 alone, no means whatever can be visually detected for connecting the welding current contact tip 14 and the gas nozzle 16 to the head member 12. The connecting means cannot be readily shown in a longitudinal cross-sectional view because, as clearly illustrated in FIGS. 2 through 5, the method employed by this invention for solidly locking the contact tip 14 within the bore 21 of the head member 12 is by compressing portions of the peripheral surface 22 of the contact tip 14 against the wall of bore 21. The method employed by this invention for solidly locking the gas nozzle 16 to the head member 12 is also by compressing portions of the inner wall 23 of the gas nozzle 16 against the insulating sleeve 15 with a portion of said locking force transferred through the wall of the insulating sleeve 15 to lock both the sleeve 15 and the gas nozzle 16 to the periphery of the head member 12.

Referring now to FIG. 2, the inventive means for firmly connecting and locking the contact tip 14 within the bore 21 of the head member 12 is clearly shown. In FIG. 2, it is important to note that the periphery 22 of the cross-sectional configuration of the contact tip 14 is oval and that the cross-sectional configuration of the bore 21 of the head member 12 is also oval. There is a space 25 between the periphery 22 of the oval contact tip 14 and the oval bore 21 of the head member so that the contact tip 14 may be slipped into and out of the bore 21. In order to make this description clearly understood, an example of apparatus for actual manufacture and use follows.

The contact tip 14 shown in FIG. 2 is approximately about 0.280 inch across its narrow diameter indicated by reference numeral 26 and approximately 0.290 inch across its wide diameter indicated by reference numeral 27. The inside diameter of the bore 21 across its narrow inside diameter indicated by reference numeral 28 is approximately 0.285 inch, and its wide inside diameter indicated by reference numeral 29 is approximately 0.295 inch. Therefore, as shown in FIG. 2, there is a space 25 of approximately 0.005 inch between the periphery 22 of the contact tip 14 and bore 21 of the head member 12 which provides for easy insertion and withdrawal of the contact tip. However, it is important to note that the contact tip 14 cannot be turned 360 degrees within the bore 21 of the head member. In fact, it cannot be turned quite a full 90 degrees because the wide diameter 27 of the contact tip is 0.005 inch larger than the narrow diameter 28 across the bore of the head member.

Referring back to FIG. 1, it will be noted that the arc end of the contact tip 14 is provided with two flats 30 to accommodate a wrench. When the contact tip 14 is turned, as shown in FIG. 3, by the torque developed by a short handle wrench, the periphery of the contact tip 14 at its wide diameter 27 becomes wedged against the wall of the bore 21 of the head member.

Obviously, the difference between the wide diameter 27 of the contact tip 14 and the narrow diameter 28 of the bore 21 can be two or three thousandths of an inch less, or more, than 0.005 inch but, by experience, it has been established that for a contact of the above mentioned diameters, with a space of 0.005 inch the connection locks firmly, yet does not require an excessive amount of torque to unlock when the tip is turned in the opposite direction. Both the contact tip 14 and the head member bore 21 should be of oval cross-sectional configuration for all, or at least the major portions of their lengths, so that the locking force is exerted along two longitudinal lines of contact.

Producing a contact tip with the precise dimensions referred to in large volumes at a low cost would appear to be a problem, but this is not the case since the oval shape of the contact tip can be produced by drawing a copper element (rod or tube) through a draw die which has a drawing aperture of the required oval shape and dimensions, and by using known methods for producing the bore 19 through the contact tip. For low cost production, the 0.285 inch x 0.295 inch oval bore 21 through the head member is produced by forcing an oval arbor with these dimensions through a previously drilled hole 0.285 inch in diameter, or one or two thousandths of an inch smaller.

FIGS. 4 and 5 illustrate the means for locking the gas nozzle 16 to the head member 12. The operating principal is identical to that described above in relation to the contact tip 14. The periphery 32 of the head member 12 is oval, being 0.740 inch across its narrow diameter and 0.760 inch across its wide diameter. Normally, the electrical insulating sleeve 15 is round, and it not only has unusually high heat resisting properties but also has enough pliability so that its roundness can be altered to oval when the sleeve is telescoped over the oval shape of the head member 12.

The wall thickness of the sleeve 15 is 0.062 inch. Therefore, when the sleeve 15 is telescoped over the oval formation of the head member 12 and assumes the oval shape of the head member, the periphery of the sleeve is about 0.802 inch across its narrow diameter 33 and about 0.822 inch across its wide diameter 34.

Both the inside bore 37 and the periphery 38 of the gas nozzle 16 are oval. This part is machined from a round heavy wall copper pipe to produce a round inside diameter of 0.820 inch plus or minus 0.002 inch. The round pipe is then very slightly compressed in a punch press flattening die to alter the 0.820 inch diameter round cross-section to an oval shape which is 0.810 inch across its narrow diameter 35 and 0.830 inch across its wide diameter 36. Accordingly, since the inside diameters 0.810 inch and 0.830 inch of the gas nozzle 16 are 0.008 inch larger than the corresponding outside diameters 0.802 inch and 0.822 inch of the electrical insulating sleeve 15, the gas nozzle 16 can be easily telescoped over and withdrawn from the insulating sleeve 15.

As is the case with the contact tip, the gas nozzle 16 is locked in place by turning it either in a clockwise or counter-clockwise direction. This compresses the inner periphery 23 of the gas nozzle against the outer periphery of the sleeve 15 along two longitudinal lines of contact. The gas nozzle 16 is thus locked to the sleeve 15, and the locking force transmitted through the sleeve 15 to the outer periphery of the head member 12 locks both the sleeve 15 and the gas nozzle 16 to the head member 12. The gas nozzle 16 is unlocked by turning it in the opposite direction. There is no need for provision for using a wrench; the periphery of the gas nozzle is preferably knurled, and locking the connection by gripping the nozzle provides more than ample tightness.

The oval peripheral shape of the head member 12 is produced by drawing twelve-foot lengths of copper alloy rod 0.750 inch in diameter, or $\frac{1}{32}$ inch or so larger, through a draw die to yield the requisite oval shape having 0.740 inch and 0.750 inch diameters. The draw die is preferably made of tungsten carbide so that it will maintain dimensional accuracy for a long period of time.

It should be clearly understood that the oval cross-sectional shapes herein referred to can be either elliptical or ob-round ovals. The flattened ob-round shape is preferred, however, because its shape is more easily produced accurately in draw dies, sizing arbors, etc.

While the embodiment of the present invention as illustrated and described in the specification is at present considered to be preferred, it is understood that various modifications and improvements may be made therein, and it is intended to cover in the appended claims all such modifications and improvements as fall within the true spirit and scope of the invention.

What is claimed is:

1. In an arc welding gun, the combination comprising: a head member having a bore of oval cross-sectional shape and a current contact tip having a periphery which is of oval cross-sectional shape, the largest and smallest diameters of said oval contact tip periphery being less than the largest and smallest diameters, respectively, of said oval head member bore and the largest diameter of said oval contact tip periphery being greater than the smallest diameter of said oval head member bore such that said contact tip is adapted to be telescoped within said head member bore and then locked in place by rotating said contact tip within said head member bore to wedge said contact tip firmly in said head member bore.

2. The invention defined in claim 1 wherein, in each of said oval head member bore and said oval current contact tip periphery, the largest diameter is greater than the smallest diameter by an amount not less than 1½ percent of the smallest diameter.

3. In an arc welding gun, the combination comprising: a head member having a periphery which is of oval cross-sectional shape; insulating means carried on said head member such that its periphery takes on said oval shape of said head member periphery; and a gas nozzle having a bore of oval cross-sectional shape with the largest and smallest diameters of said gas nozzle bore being greater than the largest and smallest diameters, respectively, of said insulating means and the largest diameter of said insulating means being greater than the smallest diameter of said gas nozzle bore such that said gas nozzle is adapted to be telescoped over said insulating means and locked in place by rotating said gas nozzle relative to said head member to wedge said gas nozzle firmly on said insulating means.

4. The invention defined in claim 3 wherein, in each said oval head member periphery and said oval gas nozzle bore, the largest diameter is greater than the smallest diameter by an amount not less than 1½ percent of the smallest diameter.

5. In an arc welding gun, a head assembly comprising: a head member having a periphery of oval cross-sectional shape and a bore of oval cross-sectional shape; a current contact tip having a periphery of oval cross-sectional shape, the largest and smallest diameters of said current contact tip periphery being less than the largest and smallest diameters, respectively, of said oval head member bore and the largest diameter of said current contact tip periphery being greater than the smallest diameter of said oval head member bore such that said contact tip is adapted to be telescoped within said head member bore and locked in place by rotating said contact tip within said head member bore to wedge said contact tip firmly in said head member bore; insulating means carried on said head member such that its periphery takes on the oval shape of said head member periphery; and a gas nozzle having a bore of oval cross-sectional shape with the largest and smallest diameters of said gas nozzle bore being greater than the largest and smallest diameters, respectively, of said insulating means and the largest diameter of said insulating means being greater than the smallest diameter of said gas nozzle bore such that said gas nozzle is adapted to be telescoped over said insulating means and locked in place by rotating said gas nozzle relative to said head member to wedge said gas nozzle firmly on said insulating means.

6. For use in an arc welding gun having a head member with a bore of oval cross-sectional shape, a current contact tip having a periphery which is of oval cross-sectional shape along at least the major portion of the length of said current contact tip, the largest and smallest diameters of said oval periphery being less than the largest and smallest diameters, respectively, of the oval head member bore and the largest diameter of said current contact tip periphery being greater than the smallest diameter of said oval head member bore such that said contact tip is adapted to be telescoped within said head member bore and then locked in place by rotating said contact tip within said head member bore to wedge said contact tip firmly in said head member bore.

7. For use in an arc welding gun having a head member with a periphery of oval cross-sectional shape and insulating means carried on the head member such that its periphery takes on the oval shape of said head member periphery, a gas nozzle having a bore of oval cross-sectional shape with the largest and smallest diameters of said gas nozzle bore being greater than the largest and smallest diameters, respectively, of said insulating means and the largest diameter of said insulating means being greater than the smallest diameter of said gas nozzle bore such that said gas nozzle is adapted to be telescoped over the insulating means and locked in place by rotating said gas nozzle relative to the head member to wedge said gas nozzle firmly on the insulating means.

References Cited

UNITED STATES PATENTS

| | | | |
|---|---|---|---|
| 2,949,692 | 8/1960 | Kuhn | 285—178 X |
| 3,128,370 | 4/1964 | Meyer | 219—75 X |
| 3,398,231 | 8/1968 | Sullivan | 219—130 X |
| 3,419,289 | 12/1968 | Lari | 285—178 |

JOSEPH V. TRUHE, Primary Examiner

C. L. ALBRITTON, Assistant Examiner

U.S.Cl. X.R.

285—178